United States Patent [19]

Buysch et al.

[11] Patent Number: 4,883,835
[45] Date of Patent: Nov. 28, 1989

[54] FLAME RESISTANT ANTISTATIC POLYCARBONATE MOULDING COMPOUNDS

[75] Inventors: Hans-Josef Buysch; Norbert Schön, both of Krefeld, Fed. Rep. of Germany; Hans-Jürgen Kress, Pittsburgh, Pa.; Herbert Eichenauer, Dormagen; Josef Buekers, Krefeld, both of Fed. Rep. of Germany

[73] Assignee: Bayer Aktiengesellschaft, Leverkusen Bayerwerk, Fed. Rep. of Germany

[21] Appl. No.: 175,863

[22] Filed: Mar. 31, 1988

[30] Foreign Application Priority Data

Apr. 17, 1987 [DE] Fed. Rep. of Germany ....... 3713165
Apr. 17, 1987 [DE] Fed. Rep. of Germany ....... 3713162
Aug. 15, 1987 [DE] Fed. Rep. of Germany ....... 3727250

[51] Int. Cl.[4] .......................... C08K 5/51; C08L 51/00
[52] U.S. Cl. ...................... 524/504; 524/139; 524/140; 524/141; 524/142; 524/143; 524/508; 524/537; 524/912; 525/67

[58] Field of Search ................ 524/504, 67, 910, 912, 524/139, 140, 141, 143, 142, 508

[56] References Cited

U.S. PATENT DOCUMENTS 4,315,081 2/1982 Kobayashi et al. ...................... 525/2
4,692,488 9/1987 Kress et al. .......................... 524/139

FOREIGN PATENT DOCUMENTS 207369 1/1987 European Pat. Off. .
0142243 8/1984 Japan .

OTHER PUBLICATIONS

Patent Abstracts of Japan Band 10, Nr. 266 (C-255) (1703), 1984; JP-A-59 142 243 (Toray K.K.) 1984.

Primary Examiner—Theodore E. Pertilla
Attorney, Agent, or Firm—Connolly and Hutz

[57] ABSTRACT

This invention relates to mixtures of polycarbonates with graft polymers and copolymers which have been rendered flame resistant and which are characterized by containing modified polyalkylene ethers as antistatic agents.

10 Claims, No Drawings

FLAME RESISTANT ANTISTATIC POLYCARBONATE MOULDING COMPOUNDS

This invention relates to flame resistant, antistatic moulding compounds containing (A) 20 to 90 parts by weight of a thermoplastic aromatic polycarbonate, (B) 0 to 50 parts by weight of a graft polymer of (B.1) 5 to 90 parts by weight, preferably 30 to 80 parts by weight, of a mixture of (B.1.1) 50 to 95% by weight of styrene, α-methylstyrene, styrene substituted in the nucleus, methylmethacrylate or mixtures thereof and (B.1.2) 50 to 5% by weight of (meth)acrylonitrile, methylmethacrylate, maleic acid anhydride, N-substituted maleimide or mixtures thereof on (B.2) 95 to 10 parts by weight, preferably 70 to 20 parts by weight, of a rubber having a glass transition temperature $T_G \leq 10°$ C., (C) 5 to 70 parts by weight of a thermoplastic copolymer of (C.1) 50 to 95% by weight of styrene, α-methylstyrene, nuclear substituted styrene, methylmethacrylate or mixtures thereof and (C.2.) 50 to 5% by weight of (meth)acrylonitrile, methylmethacrylate, maleic acid anhydride, N-substituted maleimide or mixtures thereof and (D) 0 to 15 parts by weight of a low molecular weight or high molecular weight halogen compound, in particular a bromine compound, based on 100 parts by weight of A+C+D and optionally B, the halogen content resulting from components A+D amounting to 3 to 10% by weight, based on the total weight of components A and D, (E) 1 to 20 parts by weight, preferably 2 to 15 parts by weight, based on 100 parts by weight of A+C and optionally B and/or D, of a phosphorus compound corresponding to formula (I)

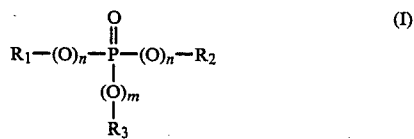

wherein $R_1$, $R_2$ and $R_3$ denote, independently of one another, an optionally halogenated $C_1$ to $C_8$ alkyl or an optionally halogenated $C_6$ to $C_{20}$ aryl and n and m each has the value 0 or 1 independently of the other, (F) 0.05 to 1.0 parts by weight, in particular 0.1 to 0.5 parts by weight, based on 100 parts by weight of A+C and optionally B and/or D, of a tetrafluoroethylene polymer having an average particle size of from 0.05 to 1000 μm and a density of from 1.2 to 2.3 g/cm³, component F being preferably used in the form of a coagulated mixture of emulsions of the tetrafluoroethylene polymers F having an average particle size of from 0.05 to 20 μm and a density of from 1.2 to 1.9 g/cm³ and emulsions of graft polymers B, the ratio by weight of graft polymer B to tetrafluoroethylene polymer F being from 95:5 to 60:40 and the amount of optionally additional quantities of B, based on 100 parts by weight of A+C and optionally B and/or D, amounting to 0.1 to 4.0 parts by weight, and (G) 0.2 to 5.0 parts by weight, preferably 1.0 to 3.0 parts by weight, based on 100 parts by weight of the sum of A to G, of one or more antistatic agents obtained from a polyalkylene ether which has been modified with a polymer of (meth)acrylates and/or other vinyl monomers, and optionally effective quantities of stabilisers, pigments, fluidizing agents and mould release agents.

According to DE-OS 2 228 072, thermoplastic polycarbonates are rendered flame resistant by means of a mixture of hexabromobenzene and an antimony compound. This mixture may in addition contain a phosphate ester as synergist although when triphenyl phosphate is added on its own in an amount of 10 parts by weight to a bisphenol A polycarbonate, it shows no antidripping action in the flammability test U.L. Subj. 94 (see page 20 of DE-OS 2 228 072).

DE-OS 2 434 085 discloses foamable thermoplastic resins and mentions inter alia polycarbonates, polymers and mixtures thereof as thermoplasts. Polymers of butadiene, styrene and acrylonitrile or of styrene alone are also mentioned. The foamable synthetic resins may contain phosphate esters as flame retardants, optionally in combination with halogen compounds. No polytetrafluoroethylene polymers are recommended as halogen compounds.

U.S. Pat. Nos. 4 355 126 and 4 107 232 disclose inter alia flame resistant ABS polymers which contain polytetrafluoroethylenes. Triphenyl phosphate is particularly preferred as flame retardant.

DE-OS 2 921 325 describes the addition of pentaerythritol diphosphates and diphosphonates as flame retardants for polycarbonates with the optional addition of halogen compounds, and according to page 9 of DE-OS 2 921 325, polyvinylidene fluorides mentioned in the cited U.S. patent specification No. 3 392 136 may be used as such halogen compounds. The polycarbonates may be mixed with ABS copolymers. Since, however, the phosphates and phosphonates having the general structure corresponding to formula (I) yield no VO in 1.6 mm when used as the only additives in a PC/ABS mixture, it may be said that the object of the present invention cannot be deduced from this literature reference.

Flame resistant mixtures of polycarbonates, ABS polymers and halogen compounds are disclosed in German Offenlegungsschriften Nos. 2 903 100 and 2 918 883. According to DE-OS 2 903 100, the flame resistance is obtained by means of special organic sulphonates. Fluorinated polyolefines may be used to prevent dripping. According to DE-OS 2 918 883 the flame resistance is obtained by means of alkali metal and alkaline earth metal salts of acids in combination with antidripping agents, and the maximum quantity of ABS polymers is only 10% by weight, based on the total mixture.

According to EP-OS 0 074 112, phosphate esters are added as plasticisers to polycarbonate/ABS mixtures. Diphenyl-octyl phosphate is mentioned there as an example of a phosphate ester. The addition of fluorinated polyolefines is not described.

GB-P 14 59 648 describes flame resistant, nondripping polymers, for example of ABS polymers or polycarbonates, to which a flame retardant additive such as triphenyl phosphate, a non-combustible fibre material and polytetrafluoroethylene resin have been added. Example 2 of GB-P 14 59 648 shows that polytetrafluoroethylene resin does not prevent dripping without the addition of the fibres.

Flame resistant polymer mixtures containing polyphoshates with molecular weights from 1600 to 150,000 in quantities of 1 to 35% by weight in addition to polytetrafluoroethylenes and organic halogen compounds are also known (EP-OS 0 103 230). The polycarbonates of these moulding compounds, however, are predominantly composed of tetramethylated diphenols.

These moulding compounds therefore have the disadvantage that they are distinctly inferior in their mechanical properties to the present moulding compounds. Furthermore, polyphosphates do not have a sufficient flame retarding effect when used in PC/ABS moulding compounds which are based on a polycarbonate not containing any alkylated diphenols.

DE-OS 3 322 260 discloses flame resistant thermoplastic moulding compounds containing
a. aromatic polycarbonates,
b. SAN graft polymers,
c. thermoplastic polymers,
d. optionally halogen compounds,
e. antimony trioxide, antimony carbonate, bismuth trioxide or bismuth carbonate, and
f. finely divided tetrafluoroethylene polymer
which is introduced into the moulding compound by way of an aqueous emulsion of SAN graft polymer b. and optionally an aqueous emulsion of the thermoplastic polymer c., whereby moulding compounds with good surfaces are obtained.

According to page 16 of the said DE-OS, this principle of incorporating tetrafluoroethylene polymers may be applied to all moulding compounds containing polycarbonates.

Reference should also be made here to FR-P 1 412 767 concerning the difficulty of working up polytetrafluoroethylenes, to U.S. Pat. No. 3 294 871 concerning the incorporation of polytetrafluoroethylenes into thermoplasts such as aromatic polycarbonates or polymers of unsaturated monomers, and to U.S. Pat. No. 3 005 797, in particular columns ¾, in which precipitation and coagulation are mentioned.

The antistatic finishing of polymers based on aromatic vinyl compounds and other vinyl monomers and optionally modified with rubber, e.g. ABS and SAN polymers, has been known for many years. The substances which have been recommended as antistatic agents include, for example, alkyl and aryl sulphonates (DOS 1 544 652), amines (DE-PS 1 258 083), salts of quaternary ammonium compounds, amides, polyethers (DE-PS 1 244 398) and phosphorus compounds such as phosphoric acids and phosphonates. These compounds, however, are not suitable as antistatic agents for the moulding compounds in question here.

Thus, for example, it is found that alkoxylated amines which have proved useful in practise for styrene polymers (according to DE-OS 1 258 083) promote molecular weight degradation of the thermoplastic polycarbonates (see e.g. D. Margotte in Ullmanns Encyclopadie der technischen Chemie, 4th Edition, volume 19, page 55, Verlag Chemie, Weinheim 1980 and H. Krimm in Methoden der organischen Chemie (Houben-Weyl), 4th Edition, volume XIV/2, page 48, Thieme Verlag, Stuttgart 1963) while the antistatic agents conventionally used for aromatic polycarbonates, e.g. sulphonic acid salts (DOS 2 931 172 and DOS 3 004 017) are not sufficiently effective in styrene polymers.

The problem therefore arose of finding an effective antistatic agent which could be used both for styrene polymers and for aromatic polycarbonates and therefore in particular for mixtures of the two.

The problem according to the invention is solved by using polyalkylene ethers which have been modified with polymers of (meth)acrylates and/or other vinyl monomers. The antistatic agents are distinguished by being highly effective without adversely affecting other properties such as the mechanical strength, surface gloss and ease of processing.

Thermoplastic aromatic polycarbonates A suitable for the purpose of this invention are based on diphenols corresponding to formula (II)

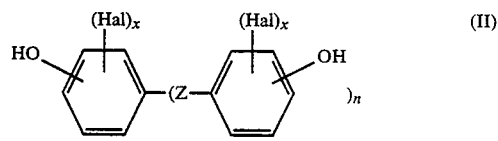

wherein Z denotes a single bond, a $C_1$ to $C_5$ alkylene group, a $C_2$ to $C_5$ alkylidene group, a $C_5$ to $C_6$ cycloalkylidene group, S or $SO_2$; Hal denotes chlorine or bromine; x stands for 0, 1 or 2 and n stands for 1 or 0; and optionally diphenols corresponding to formula (IIa)

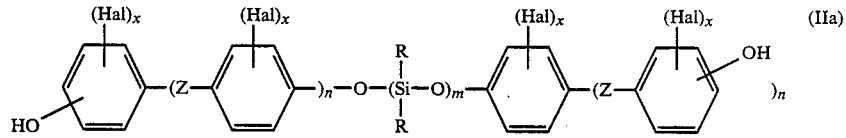

wherein Z, Hal, x and n have the meanings given for formula (II) and the groups denoted by R, which may be identical or different, are straight chained $C_1$ to $C_{20}$ alkyl groups or branched $C_3$ to $C_{20}$ alkyl groups or $C_6$ to $C_{20}$ aryl groups, preferably $CH_3$, and m stands for an integer from 5 to 100, preferably from 20 to 80.

The polycarbonates A suitable for the purpose of the invention may be homopolycarbonates or copolycarbonates. For the preparation of copolycarbonates, diphenols of formula (IIa) are only used in combination with diphenols of formula (II) and their proportion by weight in the copolycarbonates amounts to 1 to 20% by weight, preferably 1.5 to 15% by weight, especially 2 to 10% by weight, based on the total weight of the diphenols of formulae (II) and (IIa).

Component A may also consist of mixtures of the thermoplastic polycarbonates defined above, and when they are mixtures with polydiorganosiloxane-polycarbonate block copolymers the proportion by weight of diphenols (IIa) based on the total quantity of diphenols in the polycarbonate mixture is from 1 to 20% by weight.

Polycarbonates A suitable for the purpose of this invention are known and may be prepared, for example, with phosgene by the phase interface process or with phosgene by the homogeneous phase process, the so called pyridine process, and the molecular weight may be adjusted in known manner by means of known chain breaking agents (for polycarbonates containing polydiorganosiloxanes see DE-OS 3 334 873.)

Examples of suitable chain breaking agents include phenol, p-chlorophenol, p-tert.-butylphenol, 2,4,6-tribromophenol and long chained alkyl phenols such as 4-(1,3-tetramethylbutyl)-phenol according to DE-OS 2 842 005; and monoalkyl and dialkyl phenols with a total of 8 to 20 carbon atoms in the alkyl substituents according to DE-OS 3 506 472, such as 3,5-di-tert.-butyl phenol, p-iso-octyl phenol, p-tert.-octyl phenol, p-dodecyl phenol, 2-(3,5-dimethylheptyl)-phenol and 4-(3,5-dimethyl-heptyl)-phenol. The quantity of chain breaking agents to be used is generally from 0.5 to 10 mol%, based on the sum of diphenols (II) and optionally (IIa).

Polycarbonates A suitable for the purpose of this invention have average values for the molecular weight average ($\overline{M}w$, determined, for example, by ultra centrifugation or scattered light measurement) of from 10,000 to 200,000, preferably from 20,000 to 80,000.

The following are examples of suitable diphenols of formula (II): hydroquinone, resorcinol, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and 2,2-bis-(3,5-dibromo-4-hydroxyphenyl)-propane.

The following are preferred diphenols of formula (II): 2,2-bis-(4-hydroxyphenyl)-propane, 2,2-bis-(3,5-dichloro-4-hydroxyphenyl)-propane and 1,1-bis-(4-hydroxyphenyl)-cyclohexane.

Suitable diphenols of formula (IIa) are those in which R is methyl, ethyl, propyl, n-butyl, tert.-butyl or phenyl.

Preferred diphenols of formula (IIa) are those corresponding to formula (IIb):

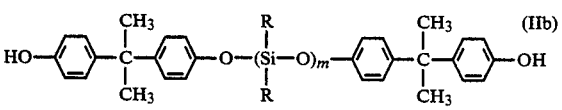

wherein the groups R are identical and have the meanings indicated above, i.e. preferably methyl, etc. or phenyl, and m stands for an integer from 5 to 100, preferably from 20 to 80.

The diphenols of formula (IIa) may be prepared from the corresponding bis-chloro compounds (III):

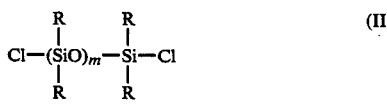

and diphenols (II), for example according to U.S. Pat. No. 3 419 634 in combination with U.S. Pat. No. 3 189 662.

In the bis-chloro compounds (III), R and m have the same meanings as in the diphenols (IIa) and (IIb).

Polycarbonates A suitable for the purpose of this invention may be branched in known manner, preferably by the incorporation of from 0.05 to 2.0 mol%, based on the sum of the diphenols put into the process, of trifunctional or higher than trifunctional compounds, for example compounds having 3 or more than 3 phenolic groups.

Preferred polycarbonates, apart from bisphenol A homopolycarbonate, are the copolycarbonates of bisphenol A with up to 15 mol%, based on the molar sums of diphenols, of 2,2-bis-(3,5-dibromo-4-hydroxyphenyl)-propane and copolycarbonates of diphenols of formula (II) with 1 to 20% by weight of diphenols of formula (IIa), preferably of formula (IIb), based in each case on the sum of the weight of diphenols (II) and (IIa) or (II) and (IIb).

Suitable rubbers for the preparation of the graft polymers B include in particular polybutadiene, butadiene/styrene copolymers (both of which may be copolymerised with up to 30% by weight, based on the weight of the rubber, of a lower alkyl ester of acrylic or methacrylic acid such as methyl methacrylate, ethyl acrylate, methyl acrylate or ethyl methacrylate), polyisoprene, polychloroprene, and alkyl acrylate rubbers (of $C_1$ to $C_8$ alkyl acrylates, in particular ethyl, butyl and ethylhexyl acrylate). The alkyl acrylate rubbers may contain up to 30% by weight, based on the weight of rubber, of monomers such as vinyl acetate, acrylonitrile, styrene, methyl methacrylate and/or vinyl ethers incorporated by copolymerisation and minor quantities, preferably up to 5% by weight based on the weight of rubber, of ethylenically unsaturated monomers which have a cross-linking action. Examples of such cross-linking agents include alkylene diol di(meth)acrylates, polyester di(meth)acrylates, divinylbenzene, trivinylbenzene, triallyl cyanurate, allyl(meth)acrylate, butadiene, and isoprene. The acrylate rubbers may also be of the type which contain a cross-linked diene rubber obtained from one or more conjugated dienes and optionally an ethylenically unsaturated monomer such as styrene and/or acrylonitrile as nucleus. EPDM rubbers, for example, are also suitable, i.e. rubbers of ethylene, propylene and an unconjugated diene.

Diene rubbers and alkyl acrylate rubbers are preferred rubbers for the preparation of graft polymers B.

The rubbers are present in the graft polymers B in the form of at least partially cross-linked particles having an average particle size of from 0.09 to 5 μm, in particular from 0.1 to 1 μm. The graft polymers B are prepared by radical graft copolymerisation of the monomer mixtures of B.1.1 and B.1.2 defined above in the presence of the rubbers B.2 which are to be grafted, and they are all known. Emulsion, solution, solvent free and suspension polymerisation are the preferred methods of preparation for graft polymers B. The so-called ABS polymers are particularly preferred graft polymers B. Halogenated styrene and p-methyl styrene are examples of styrenes which are substituted in the nucleus.

Preferred copolymers used as component C are those obtained from at least one monomer selected from styrene, α-methyl styrene and halogenated styrene according to C.1 with at least one monomer selected from acrylonitrile, methacrylonitrile, methyl methacrylate and maleic acid anhydride according to C.2.

Copolymers serving as component C are frequently formed as by-products of graft polymerisation carried out for the preparation of component B, especially when large quantities of monomers are grafted on small quantities of rubber.

The quantity of copolymer C to be used according to the invention, i.e. 5 to 70 parts by weight based on 100 parts by weight of A+C and optionally B and/or D, does not include these by-products of graft polymerisation.

The copolymers used as component C are resinous, thermoplastic and free from rubber. Particularly preferred copolymers C are those obtained from styrene with acrylonitrile and optionally methyl methacrylate; from α-methyl styrene with acrylonitrile and optionally methyl methacrylate; and from styrene and α-methyl styrene with acrylonitrile and optionally with methyl methacrylate.

Particularly preferred ratios by weight in the thermoplastic copolymer C are 60 to 80% by weight of C.1 and 40 to 20% by weight of C.2.

The copolymers used as component C are known and may be prepared by radical polymerisation, in particular by emulsion, suspension, solution or solvent free polymerisation. The copolymers of component C preferably have molecular weights Mw (weight average, determined by light scattering or sedimentation) of from 15,000 to 200,000.

Organic halogen compounds D suitable for the purpose of this invention are in principle all halogen compounds which are non-volatile and thermally stable under the conditions of preparation and processing of the moulding compounds according to the invention so that they do not split off halogen in the process and therefore can exert their flame retardant action in the event of fire. Particularly suitable halogen compounds are decabromodiphenyl ether, octabromodiphenyl, octabromodiphenyl ether and tribromotetrachlorotoluene, oligomeric bromine compounds such as oligo carbonates based on tetrabromobisphenol A and polymeric bromine compounds such as, for example, high molecular weight polycarbonates based on tetrabromobisphenol A and polyphenylene oxides which are brominated in the nucleus.

The halogen content resulting from component D may therefore also be introduced by way of the high molecular weight polycarbonate used as component A, and in the absence of component D the polycarbonate component A must have a halogen content of from 3 to 10% by weight.

The phosphorus compounds used as component E according to the invention are well known (see, for example, Ullmann, Encyclopadie der technischen Chemie, volume 18, pages 301 et sec, 1979).

The optionally halogenated $C_1$ to $C_8$ alkyl groups represented by $R_1$, $R_2$ or $R_3$ in formula (I) may be chloroethyl, 2-chloropropyl, 2,3-dibromopropyl, butyl, methyl and octyl.

The optionally halogenated $C_6$ to $C_{20}$ aryl groups represented by $R_1$, $R_2$ or $R_3$ in formula (I) may be chlorophenyl, bromophenyl, pentachlorophenyl, pentabromophenyl, phenyl, cresyl, isopropylphenyl or naphthyl.

Phosphorus compounds according to formula (I) to be used according to the invention may be tributyl phosphate, tris-(2-chloroethyl) phosphate, tris-(2,3-dibromopropyl) phosphate, triphenyl phosphate, tricresyl phosphate, diphenylcresyl phosphate, diphenyl octyl phosphate, diphenyl-2-ethylcresyl phosphate, tri-(isopropylphenyl) phosphate, halogen substituted aryl phosphates, methane phosphonic acid dimethyl ester, methane phosphonic acid diphenyl ester, and phenyl phosphonic acid diethyl ester.

Tetrafluoroethylene polymers suitable for use as component F according to the invention are polymers with fluorine contents of from 65 to 76% by weight, preferably from 70 to 76% by weight. Examples include polytetrafluoroethylene, tetrafluoroethylene-hexafluoropropylene copolymers, and tetrafluoroethylene copolymers containing small quantities of copolymerisable, ethylenically unsaturated monomers which are free from fluorine. These polymers are known. They may be prepared by known processes, for example by the polymerisation of tetrafluoroethylene in an aqueous medium with a catalyst which forms free radicals, such as sodium, potassium or ammonium peroxydisulphate at pressures of from 7 to 71 kg/cm$^2$ and at temperatures of from 0° to 200° C., preferably 20° to 100° C. (for further details see, for example, U.S. Pat. No. 2 393 967). The density of these materials may vary from 1.2 to 2.3 g/cm$^3$ and the average particle size from 0.05 to 1000 μm, depending on the form in which they are to be used.

Polytetrafluoroethylenes which are preferred for the invention have average particle sizes of from 0.05 to 20 μm, preferably from 0.08 to 10 μm, and a density of from 1.2 to 1.9 g/cm$^3$ and they are used in the form of a coagulated mixture of emulsions of tetrafluoroethylene polymers F with emulsions of the graft polymers B.

Suitable tetrafluoroethylene polymers F which may be used in powder form may have particle sizes of, for example, from 100 μm to 1000 μm and densities of from 2.0 g/cm$^3$ to 2.3 g/cm$^3$.

The addition of tetrafluoroethylene polymers mainly has the effect of reducing or completely preventing dripping of the molten moulding compound in the event of fire while their use in the form of a coagulated mixture also improves the surface of moulded articles produced from the mixtures according to the invention, which is particularly important for the manufacture of parts which have a very large surface area and for production processes employing very high temperatures.

For the preparation of a coagulated mixture of B and F, an aqueous emulsion (latex) of a graft polymer B having average latex particle sizes of from 0.1 to 2 μm, in particular from 0.2 to 0.6 μm, is first mixed with a finely divided emulsion of a tetrafluoroethylene polymer F in water, the latter emulsion having average particle sizes of from 0.05 to 20 μm, in particular from 0.08 to 10 μm. Suitable tetrafluoroethylene polymer emulsions normally have solids contents of from 30 to 70% by weight, in particular from 50 to 60% by weight. The emulsions of graft polymers B have solids contents of from 25 to 50% by weight, preferably from 30 to 45% by weight.

The ratio by weight of graft polymer B to tetrafluoroethylene polymer F in the emulsion mixture is from 95:5 to 60:40. The emulsion mixture is then coagulated in known manner, for example by spray drying, freeze drying or coagulation by means of inorganic or organic salts, acids, bases, or organic, water miscible solvents such as alcohols or ketones, preferably at temperatures of from 20° to 150° C., in particular from 50° to 100° C. If necessary, the product may be dried at 50° to 200° C., preferably at 70° to 100° C.

The tetrafluoroethylene polymer emulsions may suitably be commercial products and are marketed, for example, as Teflon ® 30N by DuPont.

The grafted polyethers (G) according to the invention are prepared by radical polymerisation of from 5 to 50% by weight, preferably from 10 to 30% by weight, of $C_1$ to $C_6$ alkyl (meth)acrylates, cycloalkyl acrylates or cycloalkyl methacrylates and optionally styrene or α-methyl styrene in the presence of from 95 to 50% by weight, preferably from 90 to 70% by weight, of a polyalkylene ether.

Any commercially available radical starters may be used for polymerisation, e.g. diacyl peroxides, peresters, dialkyl peroxides, hydroperoxides and aliphatic or araliphatic azo compounds. Preferred radical starters, e.g. azo isobutyronitrile, di-tert.-butyl peroxide, tert.-butyl perobenzoate, dicumyl peroxide and 1,3-bis-(tert.-butylperoxyisopropyl)benzene start polymerisation sufficiently rapidly at temperatures from 60° to 140° C. Dibenzoyl peroxide is particularly preferred.

The polyalkylene ethers which are to be grafted according to the invention are built up of di- and polyfunctional (cyclo) aliphatic groups and may also contain small quantities of olefinic groups. Examples of suitable polyalkylene ethers include the reaction products of di- or polyols, ethylene glycol, 1,2-propylene glycol, trimethylol propane, glycerol, pentaerythritol, sorbitol and mannitol and one or more alkylene oxides such as ethylene oxide and propylene oxide (for preparation and use, see Ullmanns Encyklopadie der technischen Chemie, 4th Edition, volume 19, page 31, Verlag Chemie, Weinheim 1980). Polyalkylene glycols containing high proportions of 1,2-propylene structures are preferred.

Both straight chained and branched polyalkylene glycols may be used, moderately branched types being preferred.

The polyalkylene glycols which are to be grafted according to the invention have molecular weights of from 500 to 15,000, preferably from 1000 to 10,000, and most preferably from 2000 to 5000.

The $C_1$ to $C_6$ alkyl (meth)acrylates, cycloalkyl acrylates and cycloalkyl methacrylates used as monomers for the graft polymerisation may also contain functional groups, so that 2-hydroxyethyl(meth)acrylate and 3-hydroxypropyl (meth)acrylate, for example, are suitable. Methylmeth acrylate, ethyl acrylate, butyl acrylate, cyclohexyl acrylate, benzyl acrylate and 2-ethylhexyl acrylate are preferred.

Styrene and α-methyl styrene may be used in addition to these acrylate monomers.

The polyalkylene ethers which are modified by grafting are generally medium viscosity to high viscosity, almost clear liquids or colourless suspensions.

The moulding compounds according to the invention may contain other known additives, such as stabilisers, pigments, fluidizing agents and/or mould release agents.

The moulding compounds according to the invention, consisting of components A, C, E, F and G and optionally B and/or D and optionally other known additives, such as stabilisers, pigments, fluidizing agents and/or mould release agents, are prepared by mixing the components in known manner and melt compounding or melt extruding them at tmperatures from 200° C. to 330° C. in the usual apparatus such as internal kneaders, extruders or double shaft screws, component F being preferably used in the form of the coagulated mixture already mentioned above.

The present invention thus relates to a process for the preparation of thermoplastic moulding compounds consisting of components A, C, E, F, G, and optionally component B, component D, stabilisers, pigments, fluidizing agents and/or mould release agents, characterised in that components A, C, E, F and G and optionally component B, component D, stabilisers, pigments, fluidizing agents and/or mould release agents are mixed and then melt compounded or melt extruded at temperatures of from 200° C. to 300° C. in the usual apparatus, component F being preferably used only in the form of a coagulated mixture with component B.

The individual components may be mixed in known manner, either successively or simultaneously, either at about 20° C. (room temperature) or at elevated temperatures.

The moulding compounds of the present invention may be used for the production of any type of moulded article, in particular for the production of injection moulded articles. The following are examples of moulded articles which may be produced: housing parts of all types, e.g. for domestic appliances such as juice extractors, coffee machines or mixers, office machinery or cover plates for the building sector and parts for the motor vehicle industry. They are also used in the field of electro technology on account of their very good electrical properties.

Moulded products may also be produced from plates or films by deep drawing.

The term "particle size" is always used in the present context to denote the average particle diameter $d_{50}$ determined by ultracentrifuge measurements according to W. Scholtan et al, Colloids u. Z. Polymers 250 (1972) 782 to 796.

EXAMPLES

Polycondensates and polymers used in the process.

(A) A copolycarbonate of bisphenol A containing 10% by weight of tetrabromobisphenol A and having a relative solution viscosity of 1.284, determined in $CH_2Cl_2$ at 25° C., and a concentration of 0.5% by weight; bromine content: 5% by weight.

(B) SAN graft polymer of 50% by weight of a styrene-acrylonitrile mixture (in ratios by weight of 72:28) on 50% of particulate polybutadiene having an average particle size ($d_{50}$) of 0.4 μm, obtained by emulsion polymerisation.

(C) Styrene-acrylonitrile copolymer containing a ratio of styrene to acrylonitrile of 72:28 and having a limiting viscosity ($\eta$) of 0.55 dl/g (determination in dimethyl formamide at 20° C.).

(E) Triphenyl phosphate.

(F) Tetrafluoroethylene polymer as coagulated mixture of a SAN graft polymer emulsion in water and a tetrafluoroethylene polymer emulsion in water. The ratio by weight of graft polymer B to tetrafluoroethylene polymer F in the mixture is 90% by weight: 10% by weight. The tetrafluoroethylene polymer emulsion has a solids content of 60%. The particle size is in the range of from 0.05 to 0.5 μm. The SAN graft polymer emulsion has a solids content of 34% by weight and has a latex particle size of from 0.3 to 0.4 μm.

Preparation of (F). The emulsion of tetrafluoroethylene polymer was mixed with the emulsion of SAN graft polymer B and stabilised with 1.8% by weight of phenolic antioxidants, based on the weight of polymer solids content. The mixture is coagulated with an aqueous solution of $MgSO_4$ (epsom salts) and acetic acid at 85° to 95° C. and at pH 4 to 5 and filtered, washed until virtually free from electrolytes, then freed from the major proportion of water by centrifugation and finally dried to a powder at 100° C. This powder may then be compounded with the other components in the apparatus described.

All reaction mixtures contain 0.5 parts by weight of carbon black as black pigment (Black Pearls 900).

The individual components were compounded in a 3 liter internal kneader at a temperature of from 200° C. to 220° C.

The moulded articles were produced in an injection moulding machine at 240° C.

The fire characteristics of the samples were measured on test samples 1.6 mm in thickness according to UL-Subj. 94 V. The UL-94 test is carried out as follows:

Samples of the substance are formed into rods measuring 127×12.7×1.6 mm. The rods are mounted vertically so that the underside of the sample is situated 305 mm above a strip of bandaging material. Each sample rod is ignited individually by means of two successive ignitions 10 seconds in duration, the fire characteristics after each ignition are observed and the sample is then assessed. A Bunsen Burner adjusted to provide a 10 mm (⅜ inch) high blue flame of natural gas with a thermal unit of $3.73 \times 10^4$ kJ/m³ (1000 BTU per cubic foot) is used for igniting the sample.

The UL-94 V-0 classification covers the properties of materials described below, which are tested according to the UL-94 specification. The moulding compounds in this class do not contain any samples which burn for longer than 10 seconds after exposure to the test flame. None of them has a total flaming time of more than 50 seconds when each sample of the set is exposed to the flame twice. They do not contain any samples which burn down completely to the clamp fixed to the upper end of the sample. They do not contain any samples which ignite the cotton wool under the sample by burning droplets or particles, nor do they contain any samples which continue to glow for more than 30 seconds after removal of the test flame.

Other UL-94 classifications cover samples which are less flame resistant and self extinguishing and which give off burning droplets or particles. These classifications are characterised by the symbols UL-94 V-1 and V-2.

N.B. stands for "nicht bestanden" (=failed) and is the classification of samples which have an after-burning time of $\geq 30$ seconds.

Determination of the dimensional stability under heat according to Vicat (Method B) was carried out according to DIN 53 460.

The test for determining the notched impact strength was based on DIN 53 456/ISO R 179 and was carried out on rods measuring 50×60×4 mm which had a V shaped notch 2.7 mm in depth.

The dust test was carried out on plates measuring 155×75×2 mm. The plates were stored in the open and the number of dust figures were counted at various intervals of time.

The moulding compounds were prepared by compounding the starting blend with the quantities of antistatic agent according to the invention shown in the following table in accordance with the methods described above. The starting blend had the following composition:

67.7 parts by weight of A
12.2 parts by weight of B
20.1 parts by weight of C
and, based on 100 parts by weight of A+B+C,
11.6 parts by weight of E
4.2 parts by weight of F.

The following products were used as antistatic agents G:

(G.1) Prepared from 25 parts by weight of methyl methacrylate and 75 parts by weight of a branched polyether based on sorbitol with propylene oxide (82 parts) and ethylene oxide (18 parts), OH number 28.

(G.2) Prepared from 25 parts by weight of styrene and 75 parts by weight of the polyalkylene glycol used for G.1.

(G.3) Prepared from 15 parts by weight of ethyl acrylate and 85 parts by weight of a polyhydroxy-polyalkylene glycol (OH number=28) of trimethylol propane, propylene oxide (87 parts) and ethylene oxide (13 parts).

(G.4) Prepared from 25 parts by weight of methyl methacrylate and 75 parts by weight of the polyalkylene glycol used for G.3.

The antistatic agents G.1 to G.4 are prepared by the following general method:

A vinyl monomer or a mixture of several vinyl monomers is added dropwise at 95° to 100° C. and with exclusion of air to a polyether and dibenzoyl peroxide (1% by weight) over a period of 2 to 3 hours and the mixture is then polymerised for 5 to 6 hours at this temperature.

The following table shows that the antistatic agents according to the invention do not impair to any significant extent, if at all, the most important product properties such as flame resistance, toughness and dimensional stability under heat.

TABLE

| Starting Blend (% by weight) | Components | | | | | | Notched Impact Strength (kJ/m²) | Vicat-$B_{120}$ (°C.) | Dust Test | | |
|---|---|---|---|---|---|---|---|---|---|---|---|
| | G.1 | G.2 | G.3 | G.4 | Carbon Black | UL-94V (1.6 mm) | | | 5 days | 13 days | 18 days |
| | (% by weight) | | | | | | | | | | |
| Examples according to the invention | | | | | | | | | | | |
| 98.5 | 1.0 | | | | 0.5 | V 1 | 14.0 | 92 | 1 | 1-2 | 3 |
| 96.5 | 3.0 | | | | 0.5 | V 1 | 14.6 | 91 | 1 | 1 | 1 |
| 98.5 | | 1.0 | | | 0.5 | V 0 | 14.0 | 92 | 1 | 1-2 | 2 |
| 96.5 | | 3.0 | | | 0.5 | — | 13.7 | 92 | 1 | 1 | 1 |
| 98.5 | | | 1.0 | | 0.5 | V 1 | 13.9 | 90 | 1 | 1 | 1 |
| 96.5 | | | 3.0 | | 0.5 | V 1 | 11.8 | 90 | 1 | 1 | 1 |
| 98.5 | | | | 1.0 | 0.5 | V 1 | 13.1 | 91 | 1 | 1 | 1 |
| 96.5 | | | | 3.0 | 0.5 | V 1 | 14.9 | 92 | 1 | 1 | 1 |
| Comparison Example | | | | | | | | | | | |
| 99.5 | | | | | 0.5 | V 0 | 13.4 | 92 | 3-4 | 4 | 4 |

Assessment of dust test:
1 = no dust figures
2 = 1 to 3 dust figures
3 = 4 to 10 dust figures
4 = >10 dust figures

We claim:
1. Thermoplastic moulding compounds containing

(A) 20 to 90 parts by weight of a thermoplastic aromatic polycarbonate,
(B) 0 to 50 parts by weight of a graft polymer of
(B.1) 5 to 90 parts by weight of a mixture of
(B.1.1) 50 to 95% by weight of styrene, α-methyl styrene, nuclear substituted styrene, methyl methacrylate or mixtures thereof and
(B.1.2) 50 to 5% by weight of (meth)acrylonitrile, methyl-methacrylate, maleic acid anhydride, N-substituted maleimide or mixtures thereof on
(B.2) 95 to 10 parts by weight of a rubber having a glass transition temperature of $T_G \leq 10°$ C.,
(C) 5 to 70 parts by weight of a thermoplastic copolymer of
(C.1) 50 to 95% by weight of styrene, α-methyl styrene, nuclear substituted styrene, methyl methacrylate or mixtures thereof and
(C.2) 50 to 5% by weight of (meth)acrylonitrile, methyl methacrylate, maleic acid anhydride, N-substituted maleimide or mixtures thereof, and
(D) 0 to 15 parts by weight of a low molecular weight or high molecular weight halogen compound based on 100 parts by weight of A+C+D and B when present, wherein the halogen content resulting from components A+D is to 3 to 10% by weight, based on the total weight of components A and D,
(E) 1 to 20 parts by weight, based on 100 parts by weight of A+C and B and D when present, of a phosphorus compound corresponding to the formula (I)

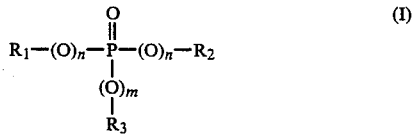

wherein
R$_1$, R$_2$ and R$_3$ denote, independently of one another, an unsubstituted or halogenated C$_1$ to C$_8$ alkyl or an unsubstituted or halogenated C$_6$ to C$_{20}$ aryl and
n and m denote, independently of one another, 0 or 1, and
(F) 0.05 to 1.0 parts by weight, based on 100 parts by weight of A+C and B and D when present, of a tetrafluoroethylene polymer having average particle sizes of from 0.05 to 1000 μm and a density of from 1.2 to 2.3 g/cm$^3$ and (G) 0.2 to 5.0 parts by weight, based on 100 parts by weight of the sum of A to G, of one or more antistatic agents obtained from a polyalkylene ether which has been modified with a polymer of at least one of (meth)acrylates or other vinyl monomers.

2. Moulding compounds according to claim 1, characterised in that component F is used in the form of a coagulated mixture of emulsions of tetrafluoroethylene polymers F having an average particle size of from 0.05 to 20 μm and a density of from 1.2 to 1.9 g/cm$^3$ with emulsions of graft polymers B, the ratio by weight of graft polymer B to tetrafluoroethylene polymer F being from 95:5 to 60:40 and the amount of additional quantities of B being from 0.1 to 4.0 parts by weight, based on 100 parts by weight of A+C and B and D when present.

3. Moulding compounds according to claim 1, characterised in that the tetrafluoroethylene polymer used as component F has average particle sizes of from 100 to 1000 μm and a density of from 2.0 to 2.3 g/cm$^3$.

4. Moulding compounds according to claim 1, characterised in that component G is used in quantities of from 1.0 to 3.0 parts by weight.

5. Moulding compounds according to claim 1, characterised in that component B is composed of 30 to 80 parts by weight of B.1 and 70 to 20 parts by weight of B.2.

6. Moulding compounds according to claim 1, characterised in that component E is used in quantities of from 2 to 15 parts by weight.

7. Moulding compounds according to claim 1, characterised in that component F is used in quantities of from 0.1 to 0.5 parts by weight.

8. Moulding compounds according to claim 1, consisting of components A, C, E, F, G and B and D when present and in addition at least one additive selected from stabilisers, pigments, fluidizing agents and mould release agents.

9. Process for the preparation of moulding compounds according to claim 1, characterised in that components A, C, E, F, G, and B and D when present are mixed in known manner and then melt compounded or melt extruded at temperatures of from 200° to 330° C. in conventional apparatus.

10. Process for the preparation of the moulding compounds according to claim 9, characterised in that at least one additive selected from stabilisers, pigments, fluidizing agents and mould release agents is included.

* * * * *